United States Patent
Bouche et al.

(10) Patent No.: US 11,649,086 B2
(45) Date of Patent: May 16, 2023

(54) TRAY FOR A STORAGE LIFT

(71) Applicant: Kardex Produktion Deutschland GmbH, Neuburg/Kammel (DE)

(72) Inventors: Norbert Bouche, Landau (DE); Dennis Jamin, Karlsruhe (DE)

(73) Assignee: KARDEX PRODUKTION DEUTSCHLAND GMBH, Neuburg/Kammel (DE)

( * ) Notice: Subject to any disclaimer, the term of this patent is extended or adjusted under 35 U.S.C. 154(b) by 0 days.

(21) Appl. No.: 16/753,865

(22) PCT Filed: Nov. 21, 2018

(86) PCT No.: PCT/EP2018/082034
§ 371 (c)(1),
(2) Date: Apr. 6, 2020

(87) PCT Pub. No.: WO2019/101780
PCT Pub. Date: May 31, 2019

(65) Prior Publication Data
US 2020/0283186 A1 Sep. 10, 2020

(30) Foreign Application Priority Data
Nov. 24, 2017 (DE) .................. 10 2017 221 099.0

(51) Int. Cl.
*B65D 1/34* (2006.01)
(52) U.S. Cl.
CPC ..................... *B65D 1/34* (2013.01)

(58) Field of Classification Search
CPC .......... B65D 1/34; B65D 1/36; B65D 19/002; B65G 1/00; B65G 1/02; B65G 1/26; B65G 1/04
See application file for complete search history.

(56) References Cited

U.S. PATENT DOCUMENTS

| | | | | |
|---|---|---|---|---|
| 3,023,910 A | * | 3/1962 | Schless | A47B 88/483 211/162 |
| 4,899,925 A | * | 2/1990 | Bowden | B65D 1/34 229/407 |
| 6,149,053 A | * | 11/2000 | Chatterton | B65D 1/26 220/608 |

(Continued)

FOREIGN PATENT DOCUMENTS

| | | |
|---|---|---|
| CA | 2425195 | 11/2003 |
| CN | 103770997 | 5/2015 |

(Continued)

OTHER PUBLICATIONS

International Search Report issued in related PCT/EP2018/082034, dated Feb. 12, 2019.

(Continued)

*Primary Examiner* — Javier A Pagan
(74) *Attorney, Agent, or Firm* — Barnes & Thornburg LLP; Jeffrey R. Stone

(57) ABSTRACT

The invention refers to tray for a storage lift and a method for producing a tray. In order to provide a tray that has an increased load-bearing capacity, which is at the same time compact and easy to manufacture, it is provided according to the invention that the bottom is plastically deformed at at least one area spaced from at least one edge region.

13 Claims, 4 Drawing Sheets

(56) References Cited

U.S. PATENT DOCUMENTS

2003/0205495 A1\* 11/2003 Verna ............... B65D 25/54
                                                206/509
2010/0101685 A1  4/2010 Kitajima

FOREIGN PATENT DOCUMENTS

| | | |
|---|---|---|
| CN | 204310178 | 5/2015 |
| CN | 204548971 | 8/2015 |
| CN | 205186708 | 4/2016 |
| CN | 205735413 | 11/2016 |
| CN | 206125705 | 4/2017 |
| DE | 8326738 | 12/1983 |
| EP | 0051868 | 5/1982 |
| GB | 1363765 | 8/1974 |
| JP | 2014181043 A | 9/2014 |

OTHER PUBLICATIONS

Office Action issued by the Japanese Patent Office for application No. 201880075779X and dated Nov. 29, 2021.
Office Action issued by the Chinese Patent Office for application No. 201880075779X and dated Apr. 15, 2022.

\* cited by examiner

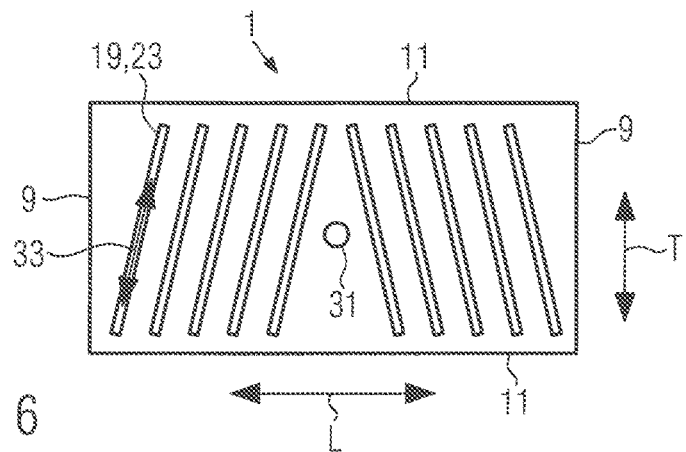
FIG. 6
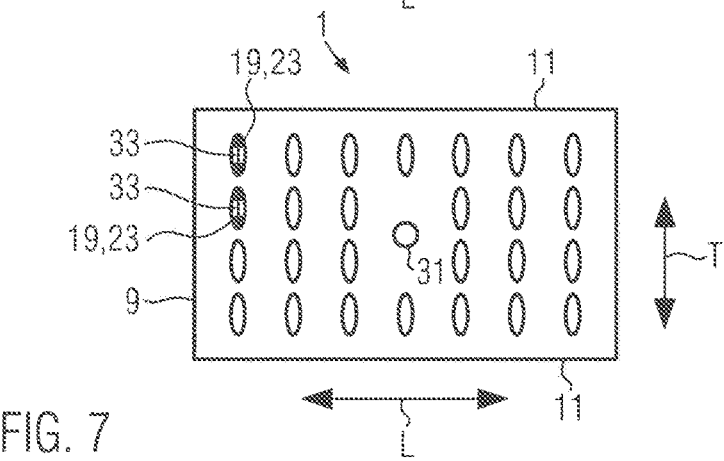
FIG. 7
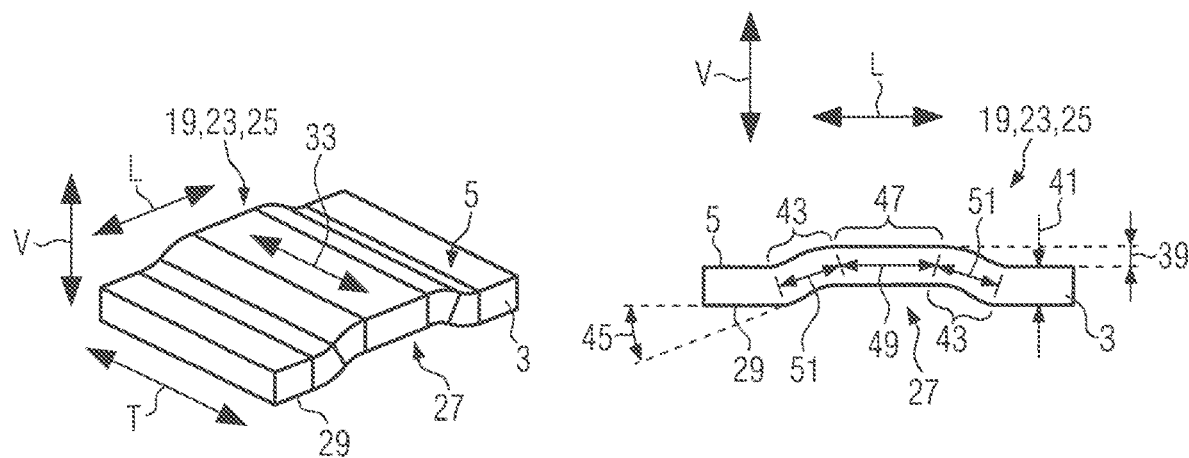
FIG. 8
FIG. 9

TRAY FOR A STORAGE LIFT

The invention refers to a tray for a storage lift, with a bottom for depositing stored goods. The invention also refers to a method for manufacturing a tray from a sheet metal material.

Trays for storage lifts are well known. They are used to store stored goods in a storage lift and are usually movably accommodated in such a lift. There are a number of requirements for trays. Firstly, they must have sufficient load-bearing capacity for the stored goods to be stored. Furthermore, it is advantageous if trays take up little space, especially in a vertical direction, i.e. perpendicular to the bottom, so that a large number of trays can be stored one above the other in a storage lift of a given size.

It is therefore the object of the invention to provide a tray for a storage lift and a method of manufacturing such a tray which has a high load-bearing capacity and at the same time a compact design. In addition, it is advantageous if the tray is simply constructed or can be manufactured with as few manufacturing steps as possible.

For a tray of the type mentioned above, this object is solved by plastic deformation of the bottom at at least one area spaced from at least one edge region. For the aforementioned method, the object is solved by the fact that the tray is produced from a sheet metal material, in particular from a sheet, by forming, wherein a bottom of the tray is plastically deformed at at least one area spaced from at least one edge region.

The at least one plastically deformed area can lead to tension in the material of the bottom, especially in the sheet metal material. This tension can in turn produce an upward curvature of the bottom, the upward curvature being related to a comparable tray without the at least one plastically deformed area. In other words, the bottom of the tray, which would sag downward by its own weight without the at least one plastically deformed area, may sag less through the at least one plastically deformed area, or may be horizontal or curved upward instead of sagging downward. The introduction of at least one plastically deformed area thus leads to a negative pretension in the bottom, or to the bottom curving upwards, compared to a tray without the at least one plastically deformed area according to the invention.

This indirect formation of the curvature can probably be produced by displacing material of the bottom laterally, i.e. away from the at least one plastically deformed area, at the at least one plastically deformed area. This displacement of material can lead to a pressure in the bottom of the tray, in particular a laterally directed pressure. Since the tray is usually limited to its sides and these sides may be stiffened, the bottom may react to the pressure generated by the plastic deformation by forming the curvature.

Due to the upward curvature of the bottom, the tray is negatively preformed or negatively pretensioned in the unloaded state, i.e. without stored goods. If the tray is now loaded and the load acting on the bottom increases, the bottom will curve downwards. Due to the negative deformation upwards, the bottom is less curved downwards than would be the case with a comparable tray whose bottom has no plastically deformed area according to the invention. In other words, when loaded by stored goods, the bottom must first overcome the upward curvature before the weight of the stored goods causes it to curve downward. In this way, downward curvature of the bottom can be minimized. Compared to a tray without the plastic deformation area according to the invention, the bottom of the tray according to the invention is thus less strongly curved downwards under the same load. In this way, a plurality of trays can be placed one above the other with a small vertical distance in a storage lift. Since the downward curvature is reduced in comparison to a conventional tray, the tray according to the invention can therefore take up a higher load for the same space requirements.

The term "bottom of the tray" refers to a horizontal, preferably continuous structure that limits a reception area for stored goods on the tray towards the bottom. The stored goods lie, at least in sections, on a bottom surface that is accessible from above. In the method according to the invention, "bottom" refers to the area of the sheet metal material, in particular the sheet, which will later form the bottom of the tray. The at least one plastically deformed area according to the invention is to be distinguished from the deformation of the tray bottom described above, which is produced by the plastically deformed area according to the invention. While the at least one plastically deformed area according to the invention is locally limited in the bottom of the tray, in particular with respect to the surface area, the area of negative pretension or upward curvature refers to larger areas of the bottom, depending on the design, this area can also make up the majority of the bottom. For the sake of brevity, the term "sheet" will be used in the following for the term "sheet metal material". The tray, especially the bottom, can be formed from a sheet. Alternatively or additionally, the tray may also be formed from a plurality of sheets. It is also not excluded that a finished tray may have other parts, so that it is composed of a plurality of individual parts. For example, the tray can also be provided with attached corner supports.

The solution according to the invention can be further improved by different, individually advantageous designs that can be combined with each other in any way. These designs and the advantages associated with them are discussed in the following. The designs of the tray in accordance with the invention can be produced with the method according to the invention for manufacturing a tray. In other words, the advantages described with respect to the tray according to the invention also apply to the trays manufactured with the help of the method. Likewise, the advantages described with respect to the method can be transferred to the tray according to the invention.

At the at least one plastically deformed area, the curved bottom may have an upward offset. In other words, at the at least one plastically deformed area, the curved bottom may be offset upwards, at least in sections. The upward offset of the bottom may increase the tendency for the preform or pretension produced by the at least one plastically deformed area to be negative or, in other words, for the curvature of the bottom to be upwardly directed. The offset is preferably locally limited by the at least one plastically deformed area. In other words, a curvature of the bottom usually extends over a larger proportion of the bottom area of the tray than the offset.

As described above, the negative pretension of the bottom can be created by introducing a plastic deformation at at least one area in the bottom, i.e. indirectly. The at least one plastically deformed area preferably has a smaller extension over the bottom surface than the area of negative pretension or curvature. It should also be mentioned that the area of negative pretension or curvature of the bottom, preferably extends over at least $2/3$ of the bottom area, particularly preferably over the entire bottom area. In contrast, the at least one plastically deformed area preferably extends over less than $1/10$ of the bottom area.

Preferably the tray, especially its bottom, is essentially rectangular. The rectangular shape has narrow sides and longitudinal sides running transverse to these. The longitudinal sides run parallel to a longitudinal direction of the tray and the narrow sides parallel to a depth direction of the tray. It is preferred to displace more material in the longitudinal direction of the tray than in the depth direction. This can increase the tendency to create negative pretension or upward curvature.

In order to effectively create a negative pretension in the bottom, the at least one plastically deformed area may be formed by an oblong recess. The oblong recess can be a bead, for example. The at least one oblong recess preferably causes an upward offset of the bottom.

According to another advantageous design, the bottom can be provided with a plurality of oblong recesses spaced apart from each other. The at least one oblong recess extends with its longitudinal direction preferably parallel to the bottom. Preferably, the at least one oblong recess extends transversely to at least one edge of the tray.

The tray may be substantially oblong and a longitudinal direction of the at least one oblong recess may be substantially transverse to a longitudinal direction of the tray. This displaces more material in the longitudinal direction of the tray than transversely thereto, so that the at least one oblong recess can contribute to the curvature of the bottom.

As an alternative to the orientation transverse to the longitudinal direction of the tray, the at least one oblong recess may also have a different orientation. In particular, the at least one oblong recess can run diagonally, i.e. with a directional component transverse to the longitudinal direction of the tray and with a directional component parallel to the longitudinal direction. It may also be possible that the tray is provided with a plurality of oblong recesses which have different orientations. Preferably, the tray has a plurality of oblong recesses running parallel to each other. These can be parallel to each other in groups, or, in other words, form groups of parallel recesses.

According to a preferred design, the at least one oblong recess extends continuously along its longitudinal axis. Alternatively, however, the at least one oblong recess may be interrupted at at least one area. It is also possible to string a series of recesses, which need not necessarily be oblong, together along a longitudinal axis.

The at least one oblong recess, preferably all oblong recesses, if there are several, preferably has a length which is greater than 1/3, particularly preferably greater than 2/3 of a tray depth. This can effectively cause the curvature of the bottom. The tray depth refers to the depth of the tray bottom, i.e. the usable area.

If an offset is formed by the at least one plastically deformed area, this offset preferably has at least a height which at most corresponds to the thickness of the bottom. The thickness of the bottom means, in particular, the thickness of a sheet or of the material in sheet form from which the bottom is formed. The height of the offset is determined in relation to the bottom area. The preferred maximum height of the offset also applies preferably in the case where the at least one plastically deformed area is formed by an oblong recess in the form of a bead. This bead height, which is comparatively low for typical beads, may be sufficient to increase the load-bearing capacity of the tray, since the plastic deformation of the bottom caused by the beads is already sufficient to produce the negative pretension or the upward curvature of the bottom. The low height of the offset, especially of a bead, is advantageous in order not to unnecessarily restrict the volume of the storage area for stored goods above the bottom. In addition, the low height of the offset is advantageous when manufacturing the tray. In particular, if the at least one offset is introduced before the lateral edges of the tray are formed by a folded edge, the low height of the offset prevents the sheet from distorting to such an extent by the introduction of the offset that further processing is made difficult.

Preferably the at least one offset has a height which is at least 0.25 times and at most 1 time, more preferably at least 0.4 times and at most 0.7 times the thickness of the bottom. A good compromise, which causes a sufficient curvature of the bottom and at the same time seems to be unproblematic from the manufacturing point of view, can be achieved by a height of the offset which corresponds to approximately 0.55 (±0.05) times the thickness of the bottom. For a sheet thickness of 2 mm, this corresponds to an offset height of 1.1±0.1 mm.

At least one of the oblong recesses, preferably all of them if there are several, may have a trapezoidal cross-section. The cross-section is transverse to the longitudinal direction of the oblong recess. The trapezoidal cross-section can be formed like a trapezoidal sheet, i.e., isosceles, symmetrical and offset with the short bottom side of the trapezoid upwards, i.e., into the receiving area. Such a cross-section can on the one hand be advantageous for creating the curvature of the bottom. On the other hand, an oblong recess with such a cross-section, especially a bead, can be easily produced. Depending on the manufacturing process, the trapezoidal cross-section described above may be rounded. This means that the transitions between the rest of the bottom and the legs and the transitions from the legs to the short bottom side then do not have any sharp transitions, but merge into each other in a rounded manner. The legs and the short bottom side can also deviate from the straight line and be rounded for manufacturing reasons.

Alternatively, the at least one oblong recess may have a semicircular cross-section, with the convex side curved or offset into the receiving area, i.e. upwards. Other cross-sectional shapes are also possible, especially those known for beads. Only as an example, here are mentioned box-shaped and triangular cross-section. In addition, it is also possible that not all oblong recesses have the same cross section.

In accordance with an advantageous embodiment, the tray has a large number of oblong recesses, which are distributed equidistantly across the tray. The oblong recesses are preferably arranged with their longitudinal directions parallel to each other and transverse to the longitudinal directions at the same distance from each other. In addition, the oblong recesses are preferably aligned with each other. In other words, the ends of the oblong recesses in relation to their longitudinal directions can be arranged along a line parallel to the longitudinal direction of the tray.

As an alternative to the equidistant arrangement of the oblong recesses, they can also have a different distribution. For example, distances between two adjacent oblong recesses may decrease from the narrow sides of the tray towards the centre of the tray. The distance between the two outermost adjacent oblong recesses, which are closest to a narrow side, can be more than twice as large as the distance between two inner oblong recesses in the area of the centre of the tray.

Preferably the oblong recesses are distributed symmetrically over the tray. In particular, the oblong recesses can be distributed mirror-symmetrically with respect to a mirror plane running through the centre of the tray and transversely to its longitudinal direction.

Parallel to the narrow sides of the tray, the oblong recesses are preferably arranged in the centre, i.e. preferably at least one oblong recess has a substantially equal edge distance to both longitudinal sides of the tray, whereby manufacturing tolerances in the range of about 5% of the tray depth are possible.

In order to achieve a sufficiently high stability of the entire tray with the increased load-bearing capacity due to the curvature according to the invention, the tray is provided on at least one longitudinal side with at least one folded edge bordering the bottom.

Preferably the tray is formed as a stamped and bent part. As an alternative or in addition to stamp-bending, other forming techniques can also be used. Especially embossing or deep drawing. Preferably the tray is formed as a stamped-bent part with embossed and/or deep-drawn areas. The at least one plastically deformed area, in particular the at least one oblong recess, is preferably formed monolithically with the bottom of the tray. In addition, preferably also the at least one folded edge, preferably all folded edges, are formed monolithically with the bottom of the tray. In other words, the bottom of the tray, the at least one plastically deformed area and/or the at least one folded edge can be made from a single sheet by forming.

In order to produce the at least one plastically deformed area, in particular at least one displacement body can be pressed into the bottom from below. Such a displacement body may in particular be formed by a punch or a roller. The at least one plastically deformed area can also be formed by deep drawing and/or other suitable techniques.

The solution according to the invention allows the load-bearing capacity of a tray to be increased without additional stiffening elements such as welded-on beams or profiles. However, it is not impossible to provide a tray according to the invention with additional stiffening elements, even if it is, for example, provided with at least one oblong recess. The possibility of attaching at least one profile under the bottom, which runs parallel or transverse to the longitudinal direction of the tray, is only mentioned as an example. Such a profile could be a double channel profile, for example.

The negative pretension of the bottom, or the curvature, preferably has a size of +2 to −15 mm, preferably −3 to −6 mm. The values <0 to −15 mm represent an upward curvature of the bottom. The values >0 to +2 mm represent a downward curvature. As already mentioned at the beginning, the tray according to the invention also benefits from a curvature in the range of >0 to 2 mm, provided that a tray without at least one plastically deformed area is more strongly curved downwards. The size is measured between the uppermost area and the lowermost area of the curvature or of the curved bottom, in each case on the bottom surface or in each case on the bottom side of the bottom. For example, the lowest area of the curvature may be on the bottom in the immediate vicinity of a folded edge. The uppermost area of the curvature is usually located in the centre of the tray if exactly one curvature is present. If the tray is provided with additional stiffening, such as a built-in or attached profile, the uppermost area of the curvature is usually in the centre of the non-stiffened surface of the bottom.

In the following, the invention is explained in more detail on the basis of different embodiments with reference to the drawings. The combinations of features exemplarily shown in the embodiments can be supplemented by further features according to the above design according to the characteristics of the tray according to the invention required for a specific application. Individual features can also be omitted from the described embodiments, also in accordance with the above design, if the effect of this feature in a specific application is not important.

In the drawings, the same reference numerals are always used for elements of the same function and/or the same construction.

FIG. 6 shows an overview of another exemplary embodiment of a tray according to the invention;

FIG. 7 shows an overview of another exemplary embodiment of a tray according to the invention;

FIG. 8 shows a perspective, cut representation of an advantageous embodiment of an oblong recess;

FIG. 9 shows a cross-section through the oblong recess of FIG. 8; and

Figure 1:
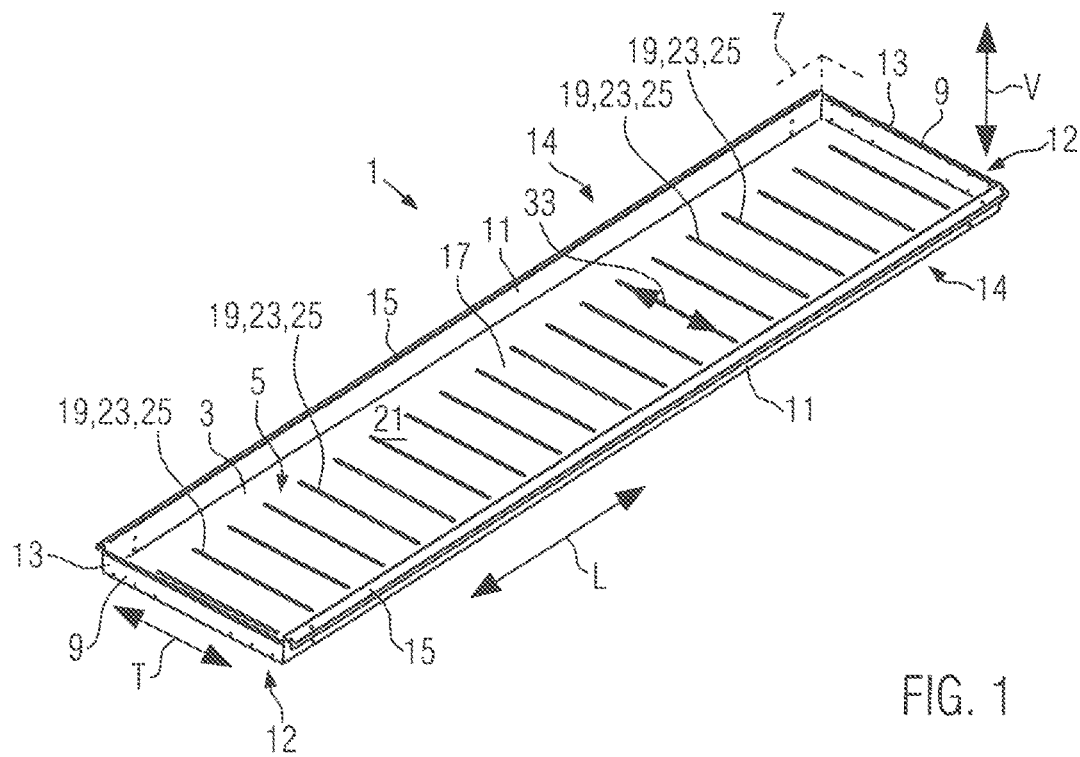
FIG. 1 shows perspective view of a first embodiment of a tray according to the invention.
Figure 2:
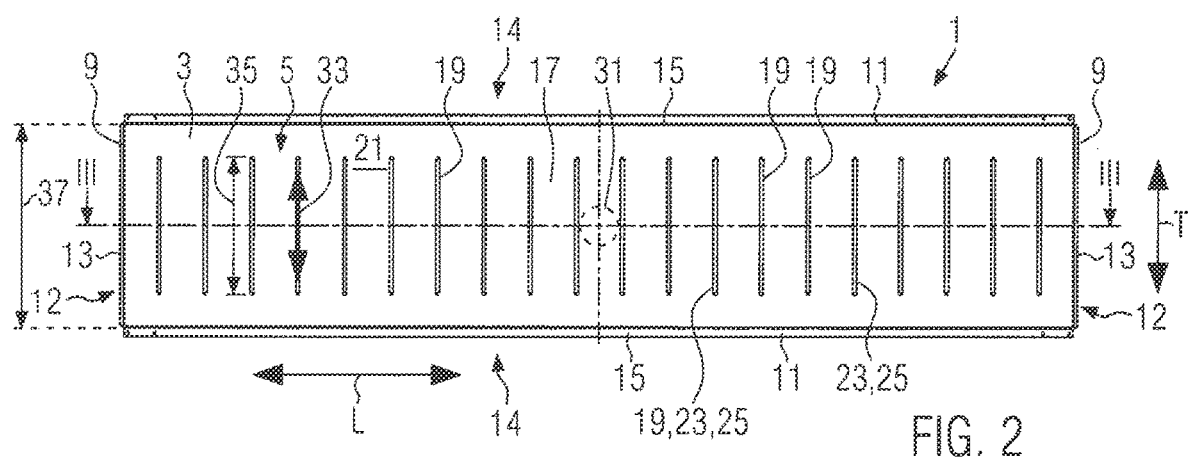
FIG. 2 shows an overview of the tray from FIG. 1.

In the following, the structure of a first advantageous embodiment of a tray 1 according to the invention is described with reference to FIGS. 1 and 2.

The tray 1 is used to receive stored goods (not shown). For this purpose, the tray 1 has a bottom 3, whose bottom area 5 is accessible from above. The bottom area 5, on which the stored goods can be placed, represents the upper side of the bottom 3. The volume on which the stored goods can be placed is limited towards the bottom by bottom 3. This volume represents a reception area 7 of the tray 1, which is indicated by dashed lines in FIG. 1.

The tray 1, or at least the bottom 3, has an essentially rectangular shape when viewed from above. Narrow sides 9 of the rectangle extend parallel to a tray depth or depth direction T. Longitudinal sides 11 of the rectangle form run transversely to the narrow sides 9 and extend parallel to a longitudinal direction L of the tray. Since tray 1 is usually accessible on at least one longitudinal side 11, the longitudinal direction L is equivalent to a width direction of the tray. Perpendicular to the longitudinal direction L and to the depth direction T is the vertical direction V of the tray, along which the height of tray 1 extends.

On the narrow sides 9, tray 1 has the folded edges 13 and on the longitudinal sides 11 the folded edges 15. On the one hand, the folded edges 13 and 15 serve to limit the bottom 3 or the bottom area 5 transversely to the vertical direction V. On the other hand, the folded edges 13 and 15 absorb forces which are transmitted into them through the bottom 3. This stiffens the structure of tray 1. Finally, the folded edges 13 and/or 15 can also be used to suspend or transport the tray 1. The narrow sides 9 and longitudinal sides 11 are usually formed from edge regions 12 and 14 of a sheet 21 from which the tray 1 is formed. The edge regions 12 are on the narrow sides 9 and the edge regions 14 on the longitudinal sides 11.

Figure 3:
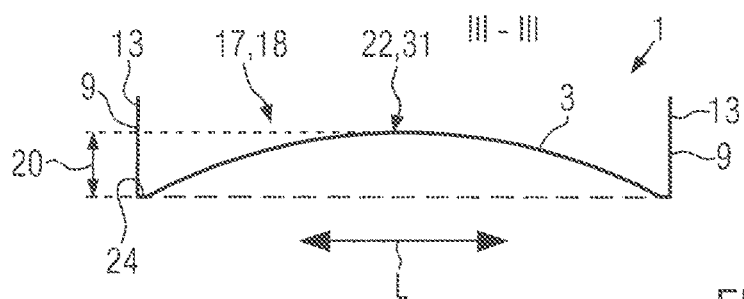
FIG. 3 shows an exemplary exaggerated representation of the curvature of a tray according to the invention in a section through the centre of the tray.

The bottom 3 preferably has a curvature 17 or a negative pretension. In other words, the bottom 3 is preferably curved upwards. The curvature 17 in an unloaded condition 18 is shown in FIG. 3 in a strongly exaggerated way. For comparison the dotted line in FIG. 3 should represent an uncurved tray. The curvature 17 preferably extends over at least ⅔ of the bottom 3 or the bottom area 5, more preferably over the entire bottom 3. The size or height 20 of the curvature 17 is preferably larger than a thickness 41 of bottom 3 and is preferably between 5 and 15 mm. The height 20 is measured between an uppermost area 22 and a lowermost area 24 of the curvature 17. As the curvature 17 preferably extends over the entire bottom 3 of the tray 1, the uppermost area 22 is normally located in the area of the centre 31 of tray 1 or bottom 3, and the lowermost area 24 is normally located near a folded edge 13 or 15.

The curvature 17 of the tray 3 increases the load-bearing capacity compared to a tray without curvature. If stored goods are placed on the bottom area 5, the tray 3 initially lowers, which makes the curvature 17 flatter. In the case of a tray which is not curved even when not under load (as indicated by the dotted line in FIG. 3), the bottom would already curve downwards under the same load. If the bottom is further loaded by taking up further stored goods, the bottom 3 of the tray 1 according to the invention will also curve downwards under a sufficiently strong load. However, this downward curvature is correspondingly less than would be the case with a comparable tray without previous upward curvature. Accordingly, the tray 1 according to the invention curves downwards less strongly under the same load than a tray without the curvature according to the invention upwards. Since a large number of trays are arranged vertically one above the other in storage lifts, a higher density of trays in the storage lift can be achieved by using the tray 1 according to the invention, since they can be arranged closer together along the vertical direction V. In contrast, conventional trays that curve strongly downwards must have a larger free space between two trays arranged one above the other. According to the invention, an upward curvature is not absolutely necessary.

The tray 1 can also have a horizontally running or even downward curved bottom 3 when not under load 18. In this case, however, the bottom 3 is not as strongly curved downwards as it would be in a comparable tray 1 without at least one plastically deformed area 19, which is discussed below.

The curvature 17 of the bottom 3 can be generated indirectly. This means that direct formation of curvature 17 itself by forming processes can be dispensed with. Instead, the bottom 3 is plastically deformed at least one area 19. Preferably, the bottom 3 has a plurality of such plastically deformed areas 19. In FIGS. 1 and 2, not all plastically deformed areas 19 are marked with a reference numeral for the sake of clarity. The at least one plastically deformed area 19 is spaced from the edge regions 12 and 14 of the tray 1.

In the plastically deformed areas 19, material of sheet 21, from which the bottom 3 is formed, is probably displaced laterally. Preferably more material is displaced in the longitudinal direction L than in the depth direction T. This displacement of material can lead to an elongation of the bottom 3 in the longitudinal direction L. However, since bottom 3 is prevented from increasing its area in the longitudinal direction L and/or in the depth direction T by the folded edge 13 and 15, it curves upwards along the vertical direction V.

At least one of the plastically deformed areas 19, preferably all plastically deformed areas 19, are monolithic, i.e. formed in one piece with the bottom 3 from the sheet metal material 21, hereinafter "sheet 21". Preferably, the plastically deformed areas 19 are inserted into the sheet 21 before the folded edges 13 and 15 are formed.

In a preferred embodiment, the plastically deformed areas 19 are formed as oblong recesses 23. The oblong recesses 23 preferably represent beads 25. Such an oblong recess 23 or bead 25 is shown in detail in FIGS. 8 and 9. These Figures should also be referred to here.

Each of the plastically deformed areas 19 preferably represents an offset 27 of the bottom 3 upwards. In this case, the term "recess" 23 thus refers to a recess 23 on the lower side 29, through which the bottom 3 is pushed upwards from the lower side 29.

The oblong recesses 23 of the first embodiment run parallel to each other and to the narrow sides 9. In depth direction T the oblong recesses 23 are aligned with each other so that they all end with both ends at imaginary lines running parallel to the longitudinal sides 11. It is preferable that the oblong recesses 23 are equidistant.

The centre 31 of the tray 3 is preferably free of plastically deformed areas 19, whereby the centre 31 refers to the centre of the tray area 5 when viewing the tray 3 from above. This can be advantageous in order to hold the tray 1 during its manufacture or the sheet 21 during its forming at its centre 31, for example by means of a turntable of a stamp-bending machine.

Along the depth direction T, the oblong recesses 23 are preferably arranged centrally between the longitudinal sides 11 of the tray 1. This means that the distances between the oblong recesses 23 and the longitudinal sides 11 or the folded edges 15 are essentially the same on both longitudinal sides 11, whereby manufacturing tolerances in the range of 5% are possible.

The oblong recesses 23 extend along longitudinal directions 33, which are preferably perpendicular to the longitudinal direction L of the tray 1. Along each of the longitudinal directions 33, the oblong recesses 23 preferably have a length 35 which is more than ⅓±10% of the depth 37 of the tray 1. In particular, the oblong recesses 23 each preferably have a length 35 which is more than ⅓±10% of the depth 37 of the tray 1. The depth 37 of the tray 1 refers to the depth 37 of the bottom area 5.

The offset 27 preferably has a height 39 which is at most as large as the thickness 41 of the bottom 3. The height 39 of the offset 27 is measured from bottom area 5 on the offset 27 in relation to the bottom area 5 in an area that is not offset upwards. The thickness 41 of the bottom 3 is preferably equal to the thickness of the sheet 21 used to manufacture the bottom 3. The height 39 of the offset 27 is preferably 0.4 to 0.7 times the thickness 41. The height 39 of the offset 27 is therefore preferably less than the height 20 of the curvature 17.

If at least one plastically deformed area 19 is formed by a bead 25, the height 39 of the offset 27 corresponds to the bead height. Alternatively, the at least one offset 27 may also have a height 39 which is greater than the thickness 41 of the bottom 3.

In accordance with an advantageous design, as also shown in FIGS. 8 and 9, the at least one oblong recess 23 or the bead 25 has a cross-section transverse to the longitudinal direction 33 of the oblong recess 23, which is trapezoidal in shape. In other words, the oblong recess 23 has in cross-section two mutually mirror-symmetrical legs 43, which run at an angle 45 to the undeformed bottom area 5. The angle 45 is preferably between 25° and 35°. Between the two legs 43 extends the essentially straight area 47. The straight area 47 preferably has a length 49 extending transversely to the longitudinal direction 33 of the oblong recess 23, which is longer than the lengths 51 of the legs 43. The oblong recess 23 thus has a flat shape overall.

The straight area 47 does not necessarily have to be exactly straight. It may also have a slight upward curvature for manufacturing reasons.

Figure 10:
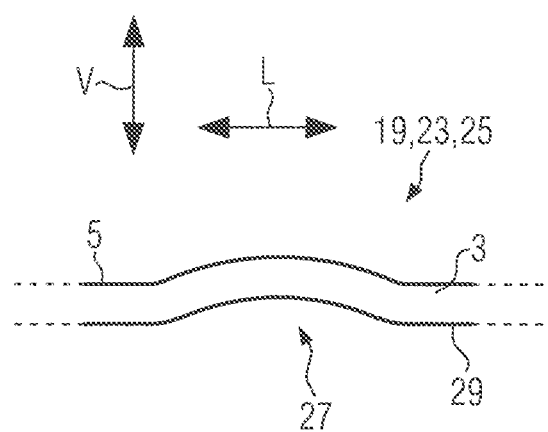
FIG. 10 shows a cross-section of another advantageous form of an oblong recess.

Alternatively or additionally, at least one oblong recess 23 may have a semicircular cross-section. In the case of a semicircular cross-section, the convex side preferably curves upwards into the reception area 7. Such a cross-section is shown in FIG. 10. Since the trapezoidal cross-section from FIGS. 8 and 9 does not necessarily have sharp transitions for manufacturing reasons, these can also be rounded, so that the cross-sectional shape can resemble the semicircular shape of FIG. 10 overall. The rounder the transitions are, the closer the trapezoidal shape approaches the semicircular shape. Other cross-sections are also possible, especially those known for beading.

Figure 4:
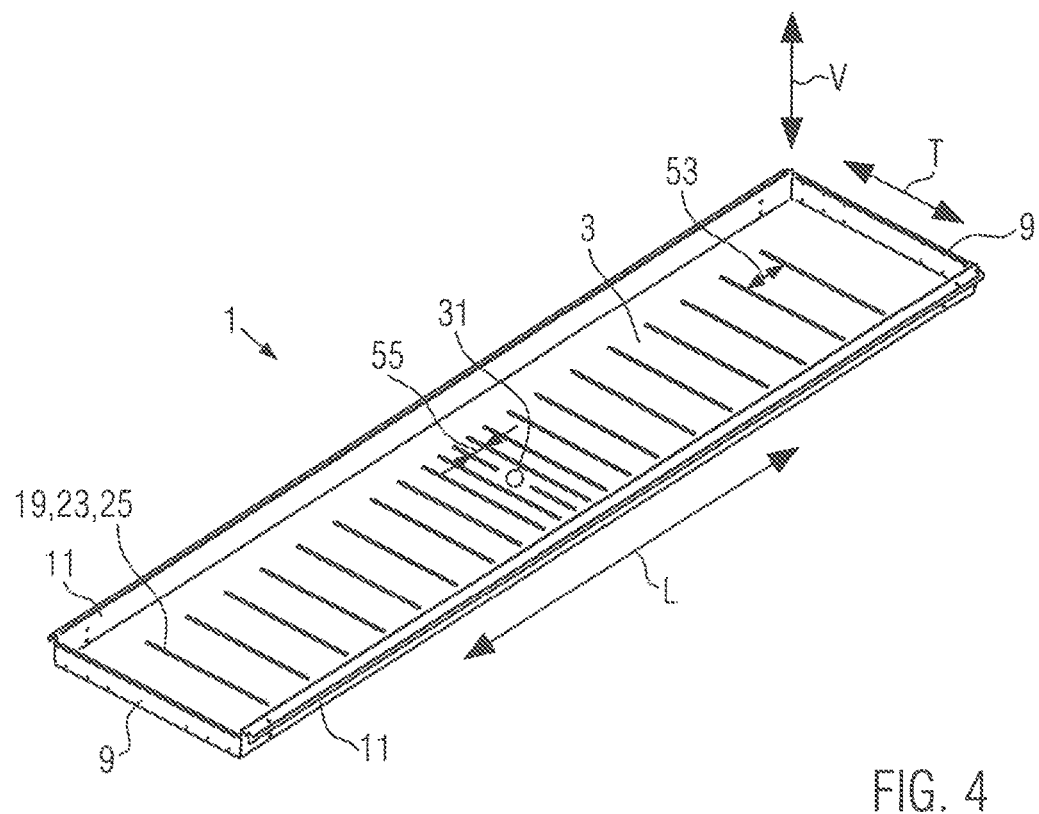
FIG. 4 shows a perspective representation of a second embodiment of a tray according to the invention.
Figure 5:
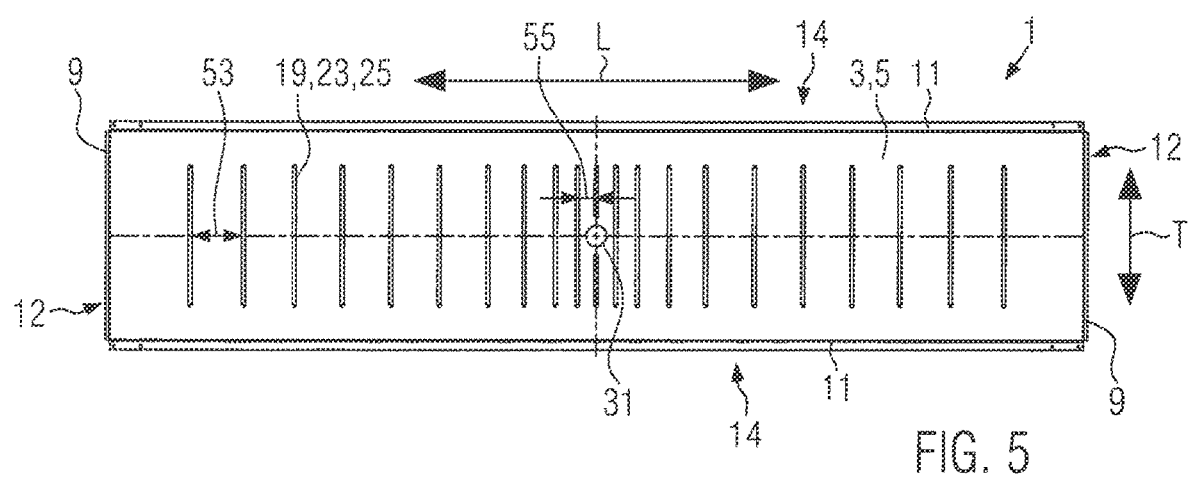
FIG. 5 shows an overview of the tray from FIG. 4.

In the following, another advantageous embodiment of a tray 1 according to the invention is described with reference to FIGS. 4 and 5. For the sake of brevity, only the differences to the embodiment described with reference to FIGS. 1 and 2 are discussed.

The second embodiment of the tray 1 in accordance with the invention differs from the first embodiment described with reference to FIGS. 1 and 2 in that the oblong recesses 23, or the beads 25, are not distributed equidistantly along the longitudinal direction L of the tray 1. Instead, the distances between two longitudinal recesses 23 decrease from the narrow sides 9 towards the centre of the tray 31.

The distribution of the oblong recesses 23 in the longitudinal direction L is preferably mirror-symmetrical with respect to a mirror plane running through the centre 31 and transversely to the longitudinal direction L. The distance 53 between the two outermost oblong recesses 23 is more than twice as large as the distance 55 between the two oblong recesses 23 nearest to the centre 31.

At the level of the centre of the tray 31 there is an oblong recess 23, which is interrupted in the area of the centre 31 in order to keep the centre 31 itself free, as in the previously described embodiment, especially for the turntable of a stamp-bending machine.

FIGS. 6 and 7 show only schematically two further examples of the design of plastically deformed areas 19 of the tray 1 according to the invention. The plastically deformed areas 19 of the tray 1 in FIG. 6 are formed as oblong recesses 23, which may be shaped like the oblong recesses 23 described above.

However, unlike the embodiment described with reference to FIGS. 1 and 2, the longitudinal directions of the oblong recesses 23 do not run parallel to the narrow sides 9 or perpendicular to the longitudinal sides 11. Instead, the oblong recesses 23 are arranged transversely, wherein they extend at an angle of less than 45° to the narrow sides 9. The oblong recesses 23 run parallel in groups. Here too, the distribution of the oblong recesses 23 is preferably symmetrical with respect to a mirror plane running through the centre 31 and transversely to the longitudinal direction L.

Only as an example, the oblong recesses 23 are arranged equidistant from each other on one half of the tray. Alternatively, the distances between two adjacent oblong recesses 23 can also vary.

Another possible design of the plastically deformed areas 19 is shown in FIG. 7. The design is similar to the first described in relation to FIGS. 1 and 2.

In contrast to the first embodiment, however, the oblong recesses 23 are not continuous. Instead, the embodiment shown in FIG. 7 has rows of oblong recesses 23, which extend along the depth direction T of the tray 1 in a row. Each of the oblong recesses 23 has a longitudinal direction 33, which is preferably also parallel to the depth direction T.

In other words, this design is similar to that of the first embodiment, with the difference that the oblong recesses 23 are interrupted several times.

LIST OF REFERENCE NUMERAS

1 tray
3 bottom
5 bottom area
7 reception area
9 narrow side
11 longitudinal side
12 edge region
13 folded edge
14 edge region
15 folded edge
17 curvature
18 unloaded condition
19 plastically deformed area
20 height of curvature
21 sheet metal material
22 uppermost point of the curvature
23 recess
24 lowermost point of the curvature
25 bead
27 offset
29 lower side of the bottom
31 centre of the tray
33 longitudinal direction of an oblong recess
35 length of an oblong recess
37 depth of the tray
39 height of the offset
41 thickness of the bottom
43 leg
45 angle
47 straight area
49 length of the straight section
51 leg length
53 distance between outer oblong recesses
55 distance between inner oblong recesses
L longitudinal direction
T depth direction
V vertical direction

The invention claimed is:

1. A tray for a storage lift, with a bottom for depositing stored goods, wherein the bottom is plastically deformed at at least one area spaced from at least one edge region,
   wherein the bottom is curved upwards in an unloaded state,
   wherein an area of curvature of the bottom extends over at least two-thirds of a bottom area,
   wherein the curved bottom comprises an upward offset at at least one plastically deformed area, the upward offset comprising a height, the height comprising at least 0.4 times and at most 0.7 times a thickness of the bottom,
   wherein the curvature of the bottom extends over a larger proportion of the bottom area than the upward offset, and
   wherein, in the plastically deformed areas, a sheet material from which the bottom is formed is displaced laterally so that the bottom is elongated in a longitudinal direction which leads to the curvature of the bottom upwards along a vertical direction as the bottom is prevented from increasing its area in the longitudinal direction and/or in a depth direction.

2. The tray according to claim 1, wherein the at least one plastically deformed area is formed by an oblong recess.

3. The tray according to claim 2, wherein the tray is substantially oblong and a longitudinal direction of the at least one oblong recess is substantially transverse to a longitudinal direction of the tray.

4. The tray according to claim 3, wherein the at least one oblong recess has a length which is greater than ⅓ of a tray depth.

5. The tray according to claim 4, wherein the at least one offset has a height which corresponds at most to a thickness of the bottom.

6. The tray according to claim 1, wherein the tray is formed as a stamped-bent part.

7. The tray according to claim 1, wherein the at least one plastically deformed area is formed monolithically with the bottom of the tray.

8. A method for producing the tray according to claim 1 from a sheet metal material by forming, wherein a bottom of the tray is plastically deformed at least one area spaced from at least one edge region, the at least one area defining an at least one plastically deformed area.

9. The method according to claim 8, wherein an upwardly directed curvature of the bottom is produced by the at least one plastically deformed area.

10. The method according to claim 8, wherein, at the at least one plastically deformed area, material of the bottom is displaced away from the at least one plastically deformed area.

11. The method according to claim 8, wherein at least one displacement body is pressed into the bottom from below at the at least one area.

12. The method according to claim 8, wherein the at least one area is formed by deep drawing the bottom.

13. The method according to claim 8, wherein the sheet metal material is folded over at least one edge region after producing the at least one plastically deformed area in the bottom.

* * * * *